2,925,428
1-METHYL-1,3,5,6,16 ESTRAPENTAENES AND A PROCESS FOR MAKING THEM

Carl Djerassi, Birmingham, Mich., and George Rosenkranz, Mexico City, Mexico, assignors to Syntex S.A., Mexico City, Mexico, a corporation of Mexico No Drawing. Application August 12, 1955
Serial No. 528,130

5 Claims. (Cl. 260—397.4)

The present invention relates to novel cyclopentanophenanthrene compounds and to a novel process for preparing the same.

More particularly, the present invention relates to novel steroid compounds having a 1-methyl aromatic ring A and an acetyl group at C–17 and to a novel process for preparing such compounds. The novel compounds produced in accordance with the present invention are believed to have therapeutic value as well as being especially suitable as intermediates for the production of therapeutic compounds.

In accordance with the present invention it has been discovered that progesterone may be tribrominated to produce a novel 2,6,17-tribromoprogesterone which may be dehydrobrominated to produce a novel $\Delta^{1,4,6,16}$-pregnatetraene-3,20-dione.

It has further been discovered that the tetraene thus produced may be subjected to a dienone-phenol rearrangement to produce novel 1-methyl-3-hydroxy-17-acetyl-$\Delta^{1,3,5,6,16}$-estrapentaene and/or acyl derivatives thereof which may be hydrogenated to produce novel 1-methyl-3-hydroxy-17-acetyl-$\Delta^{1,3,5}$-estratriene compounds. The $\Delta^{1,4,6,16}$-pregnatetraene may also be produced by dibromination of 16-dehydroprogesterone followed by refluxing with collidine.

The final compound of the process of the present invent, i.e. 1-methyl-3-hydroxy-17-acetyl-$\Delta^{1,3,5}$-estratriene is a valuable intermediate for the production of the active progestational hormone 1-methyl-19-nor-progesterone. Upon treatment of the 1-methyl-3-hydroxy-17-acetyl-$\Delta^{1,3,5}$-estratriene with methyl sulfate there is prepared the corresponding 3-methoxy derivative. Treatment of this methoxy derivative with lithium metal in liquid ammonia then produced 1-methyl-3-methoxy-19-nor-$\Delta^{2,5(10)}$-pregnadien-20-ol. Hydrolysis and rearrangement of this compound in acid medium gave 1-methyl-19-nor-$\Delta^4$-pregnen-20-ol-3-one which was then oxidized with chromic acid to 1-methyl-19-nor-$\Delta^4$-pregnen-3,20-dione (1-methyl-19-nor-progesterone).

The final compound of the process of the present invention can also be used to make the estrogenic hormone 1-methyl estradiol since the 3-acetate thereof upon degradation with perbenzoic acid gives the diacetate of 1-methyl estradiol which may be conventionally saponified.

The process of the present invention may be exemplified by the following general equations:

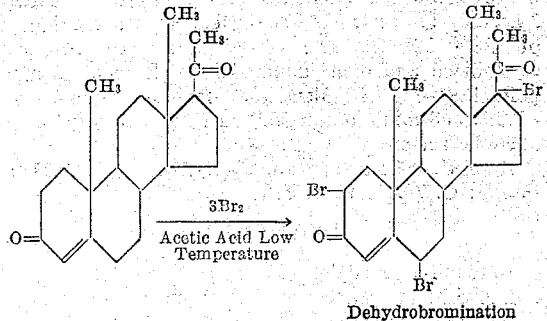

Dehydrobromination

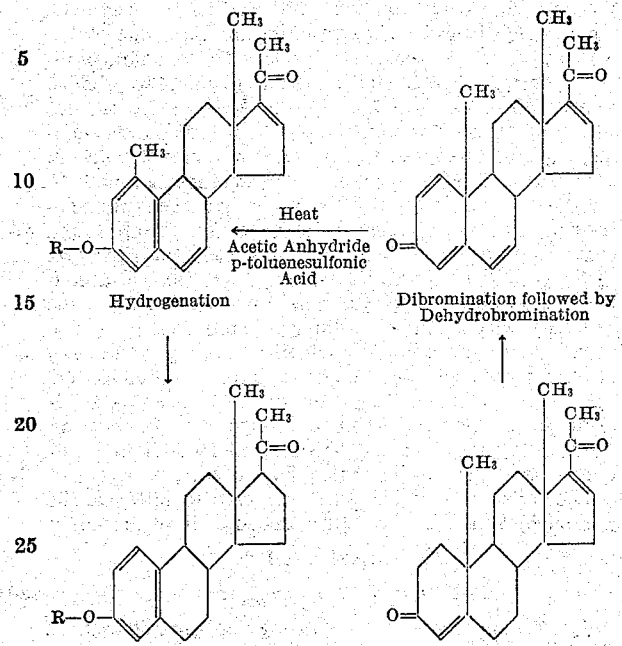

In the foregoing equations R represents the residue of acetic acid or in the event propionic acid is used for the dienone-phenol rearrangement it may represent the residue of propionic acid.

The process may be carried out in general by treating progesterone suspended in a suitable solvent preferably an ether solvent as for example ethyl ether with 3 equivalents of bromine at a low temperature, i.e. temperatures from 0° C. to 15° C. The cold suspension is first treated with a few drops of hydrogen bromide-acetic acid solution and thereafter the bromine dissolved in glacial acetic acid is slowly added. When all of the bromine had been added it was noted that all of the solid had gone into solution. After standing an additional period crystals of 2,6,17-tribromoprogesterone were deposited. The filtrate was then washed with water, dried and concentrated to produce a second crop of crystals. The crude 2,6,17-tribromoprogesterone could be recrystallized from methanol and chloroform to produce the final pure product. Although glacial acetic acid has been described as the preferred solvent for the bromine, other lower fatty acids can be used, as for example glacial propionic acid.

The tribromo compound then can be dehydrobrominated by refluxing the same with collidine for a period of time sufficient to remove 3 mols of hydrogen bromide. Thereafter ethyl acetate was added and the collidine removed by washing with dilute acid. The produce then can be isolated, as for example by evaporation, chromatographing on alumina and elution with, for example, benzene. Recrystallization from a suitable solvent, such as acetone or methanol, then produced a tetraene believed to be $\Delta^{1,4,6,16}$-pregnatetraene-3,20-dione.

The same tetraene could also be produced by dibrominating 16-dehydroprogesterone and thereafter refluxing the bromination product with collidine.

The tetraene produced, as hereinbefore set forth, can then be subjected to a dienone phenol rearrangement as above-outlined by heating a mixture of the tetraene with p-toluenesulfonic acid and acetic or propionic anhydride on a steam bath for a suitable period of time, as for example five hours.

The reaction mixture was then cooled and the anhydride hydrolyzed with water. The product was then extracted with a suitable solvent, such as ether, washed free of acid, dried and evaporated. Crystallization is preferably then induced by trituration with ether-hexane to give a relatively high yield of 1-methyl-3-acetoxy-17-acetyl-$\Delta^{1,3,5,6,16}$-estrapentaene. The motherliquors were then saponified by boiling with sodium bicarbonate, ethanol and water and the resulting oil was benzoylated with pyridine and benzoyl chloride. The reaction product could then be recrystallized from methanol to produce 1-methyl-3-benzoyloxy-17-acetyl-$\Delta^{1,3,5,6,16}$-estrapentaene.

The pentaene thus prepared was hydrogenated by treatment with hydrogen while dissolved in a suitable solvent, as for example ethyl acetate, in the presence of a palladium-on-charcoal catalyst. 2 mols of hydrogen were absorbed to produce, after filtration of the catalyst and evaporation of the solvent to dryness and final trituration of the residue with hexane, 1-methyl-3-acetoxy-17-acetyl-$\Delta^{1,3,5}$-estratriene. The 3-acetate thus produced or the benzoate which could be similarly produced by hydrogenation of the benzoate could then be saponified with alcoholic potassium hydroxide solution to produce the phenol 1 - methyl - 3 - hydroxy - 17 - acetyl - 1,3,5-estratriene. Similarly, 1-methyl-3-hydroxy-17-acetyl $\Delta^{1,3,5,6,16}$-estrapentaene could be obtained by sodium bicarbonate saponification of the equivalent acetate.

The following specific examples serve to illustrate the present invention but are not intended to limit the same:

EXAMPLE I

*Tribromination of progesterone*

An ice-cold suspension of 10 g. of progesterone in 350 cc. of ether was treated with 3 drops of hydrogen bromide-acetic acid solution followed by slow addition of a solution of 15.28 g. of bromine in 150 cc. of glacial acetic acid. At the end of the addition, all of the solid had gone into solution and after an additional one-half hour 6.5 g. of colorless crystals, with a melting point of 173°–175° C. (decomposition) were collected. The filtrate was washed well with water, dried and concentrated whereupon a second crop (3.8 g.) of solid, with a melting point of 170°–173° C. (decomposition) was obtained, raising the yield to 59%. The analytical sample of 2,6,17-tribromoprogesterone was obtained from methanol-chloroform with a melting point of 174°–176° C. (decomposition) $[\alpha]_D^{20}+2.3°$, ultraviolet maximum at 250 m$\mu$, log $\epsilon$ 4.21.

*Analysis.*—Calculated for $C_{21}H_{27}O_2Br_3$: C, 45.73; H, 4.93; Br, 43.52. Found: C, 45.93; H, 5.08; Br, 44.02.

EXAMPLE II $\Delta^{1,4,6,16}$-*pregnatetraene-3,20-dione.—From tribromoprogesterone*

10 g. of the tribromo derivative of Example I were refluxed with 40 cc. of collidine for 30 minutes resulting in the loss of 3 mols of hydrogen bromide (11.3 g. of collidine hydrobromide). After addition of ethyl acetate, the collidine was removed by washing with dilute acid and the product was isolated by evaporation, chromatographing on alumina and elution with benzene. Recrystallization from acetone or methanol afforded colorless plates (2.1 g., 37%) of the tetraene with a melting point of 239°–240° C., $[\alpha]_D^{20}+112°$, ultraviolet maxima at 234 m$\mu$ (log $\epsilon$ 4.34) and 298 m$\mu$ (log $\epsilon$ 4.19).

*Analysis.*—Calculated for $C_{21}H_{24}O_2$: C, 81.78; H, 7.84. Found: C, 81.77; H, 7.80.

EXAMPLE III

*From 16-dehydroprogesterone*

16-dehydroprogesterone (6.2 g.) was dibrominated exactly as described for the above tribromination, but since the product crystallized very poorly, the ether-acetic solution was washed very well with water, the ether evaporated and residue refluxed directly with collidine. A work-up similar to Example II gave 1.17–1.57 (19–25% over-all yield based on 16-dehydroprogesterone of $\Delta^{1,4,6,16}$-pregnatetraene-3,20-dione (found: C, 81.66; H, 7.50) with a melting point of 238°–240° C., undepressed on admixture with a specimen prepared according to Example II; the rotations and ultraviolet absorption spectra were identical.

EXAMPLE IV

*Dienone-phenol rearrangement of $\Delta^{1,4,6,16}$-pregnatetraene-3,20-dione*

A solution of 1.40 g. of the tetraenedione of Examples II and III and 0.4 g. of p-toluenesulfonic acid in 50 cc. of acetic anhydride was heated on the steam bath for four and one-half hours, then cooled and the anhydride hydrolyzed with water. The product was extracted with ether, washed free of acid dried and evaporated. Crystallization was induced by trituration with ether-hexane; yield, 0.81 g. (51%), with a melting point of 119°–126° C. Additional material was isolated from the motherliquors via the insoluble benzoate (Example V). Repeated crystallization from ether-hexane and high-vacuum sublimation led to practically colorless crystals of 1-methyl-3-acetoxy-17-acetyl-$\Delta^{1,3,5,6,16}$-estrapentaene with a melting point of 128°–130° C., $[\alpha]_D^{20}-100°$, ultraviolet maxima at 224 m$\mu$ (log $\epsilon$ 4.53) and 230 m$\mu$ (log $\epsilon$ 4.51) and minimum at 226 m$\mu$ (log $\epsilon$ 4.50).

*Analysis.*—Calculated for $C_{23}H_{26}O_3$: C, 78.82; H, 7.48. Found: C, 78.81; H, 7.62.

EXAMPLE V

The filtrate from the first crop of acetate of Example IV was saponified by boiling for one hour with 350 mg. of sodium bicarbonate, 15 cc. of ethanol and 3.5 cc. of water and the resulting oil was benoxylated with pyridine-benzoyl chloride. Crystallization from methanol afforded an additional 0.26 g. (14%) of 1-methyl-3-benzoyloxy-17-acetyl-$\Delta^{1,3,5,6,16}$-estrapentaene with a melting point of 200°–203° C. The analytical sample crystallized as needles with a melting point of 210°–212° C., $[\alpha]_D^{20}-101°$.

*Analysis.*—Calculated for $C_{28}H_{28}O_3$: C, 81.52; H, 6.84. Found: C, 81.55; H, 6.83.

EXAMPLE VI

1 - methyl - 3 - hydroxy - 17 - acetyl - $\Delta^{1,3,5,6,16}$-estrapentaene was obtained by sodium bicarbonate saponification of the pure acetate of Example IV and recrystallized from hexane-acetone; melting point 187°–188.5° C., $[\alpha]_D^{20}-101.4°$, ultraviolet maxima at 228 m$\mu$ (log $\epsilon$ 4.53), 266 m$\mu$ (log $\epsilon$ 3.91, and 306 m$\mu$ (log $\epsilon$ 3.25).

*Analysis.*—Calculated for $C_{21}H_{24}O_2$: C, 81.78; H, 7.84. Found: C, 81.94; H, 8.11.

EXAMPLE VII

*1-methyl-3-acetoxy-17-acetyl-$\Delta^{1,3,5}$-estratriene*

A solution of 0.33 g. of the acetate of Example IV in 20 cc. of ethyl acetate absorbed two mols of hydrogen in forty-five minutes in the presence of 80 mg. of 5% palladium-on-charcoal catalyst. Filtration of the catalyst, evaporation of the solvent to dryness and trituration of the residue with hexane gave 0.31 g. (81%) of 1-methyl-3-acetoxy-17-acetyl-$\Delta^{1,3,5}$-estratriene with a melting point of 128°–130° C. The analytical sample was once recrystallized and then sublimed in high vacuum, melting point 129°–131° C., ultraviolet maximum at 268 m$\mu$ (log $\epsilon$ 2.59) and minimum at 252 m$\mu$ (log $\epsilon$ 2.42) typical of a phenolic acetate.

*Analysis.*—Calculated for $C_{23}H_{30}O_3$: C, 77.93; H, 8.53. Found: C, 78.14; H, 8.75.

EXAMPLE VIII 1-methyl-3-benzoyloxy-17-acetyl-$\Delta^{1,3,5}$-estratriene was obtained by the procedure of Example VII by hydrogenation of the benzoate of Example V and crystallized from ethyl acetate as colorless needles with a melting point of 181.5°–183° C., $[\alpha]_D^{20}+200°$.

*Analysis.*—Calculated for $C_{28}H_{32}O_3$: C, 80.73; H, 7.75. Found: C, 80.74; H, 7.96.

EXAMPLE IX

Saponification of the benzoate of Example VIII with 2% methanolic potassium hydroxide solution followed by recrystallization from hexane-acetone produced 1-methyl-3-hydroxy-17-acetyl-$\Delta^{1,3,5}$-estratriene with a melting point of 250°–251.5° C., $[\alpha]_D^{20}+200°$ (dioxane), ultraviolet maximum at 284 m$\mu$ (log $\epsilon$ 3.31) and minimum at 252 m$\mu$ (log $\epsilon$ 2.49).

*Analysis.*—Calculated for $C_{21}H_{28}O_2$: C, 80.73; H, 9.03. Found: C, 80.60; H, 9.02.

The present application is a continuation-in-part of application Serial No. 183,302, filed September 5, 1950, now abandoned.

We claim:

1. A process for the production of a 1-methyl-3-acyloxy-17-acetyl-$\Delta^{1,3,5,6,16}$-estrapentaene selected from the group consisting of 1-methyl-3-acetoxy-17-acetyl-$\Delta^{1,3,5,6,16}$-estrapentaene and 1-methyl-3-propionoxy-17-acetyl-$\Delta^{1,3,5,6,16}$-estrapentaene which comprises treating progesterone with 3 equivalents of bromine at low temperature in the presence of a lower fatty acid to produce 2,6,17-tribromoprogesterone, dehydrobrominating and tribromoprogesterone to produce $\Delta^{1,4,6,16}$-pregnatetraene-3,20-dione with collidine and heating said dione with an acid anhydride selected from the group consisting of acetic anhydride and propionic anhydride in the presence of p-toluenesulfonic acid.

2. A process for the production of a 1-methyl-3-acyloxy-17-acetyl-$\Delta^{1,3,5}$-estratriene selected from the group consisting of 1-methyl-3-acetoxy-17-acetyl-$\Delta^{1,3,5}$-estratriene and 1-methyl-3-propionoxy-17-acetyl-$\Delta^{1,3,5}$-estratriene which comprises hydrogenating a corresponding 1-methyl-3-acyloxy-17-acetyl-$\Delta^{1,3,5,6,16}$-estrapentaene in the presence of a palladium catalyst until approximately 2 mols of hydrogen is absorbed.

3. A 1-methyl-17-acetyl-$\Delta^{1,3,5,6,16}$-estrapentaene compound having the following structural formula:

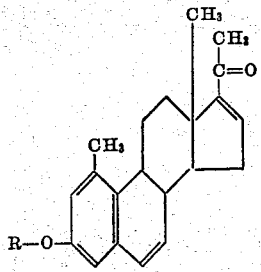

wherein R is selected from the group consisting of hydrogen, the residues of lower fatty acids and benzoic acid.

4. 1-methyl-3-acetoxy-17-acetyl-$\Delta^{1,3,5,6,16}$-estrapentaene.

5. 1 - methyl - 3 - benzoyloxy - 17 - acetyl - $\Delta^{1,3,5,6,16}$-estrapentaene.

References Cited in the file of this patent

UNITED STATES PATENTS

| | | |
|---|---|---|
| 2,361,847 | Inhoffen | Oct. 31, 1944 |
| 2,369,065 | Marker | Feb. 6, 1945 |
| 2,671,092 | Djerassi | Mar. 2, 1954 |
| 2,700,674 | Velluz | Jan. 25, 1955 |
| 2,705,237 | Djerassi | Mar. 29, 1955 |
| 2,705,719 | Rubin | Apr. 5, 1955 |